United States Patent
Suresh et al.

(10) Patent No.: US 9,814,038 B2
(45) Date of Patent: Nov. 7, 2017

(54) 6LOWPAN BASED MULTIDISCIPLINARY WIRELESS SENSOR PROTOCOL FOR CONNECTED HOME SECURITY SYSTEMS

(71) Applicant: Honeywell International Inc., Morristown, NJ (US)

(72) Inventors: Sandeep Suresh, Karnataka (IN); Kenneth Eskildsen, Great Neck, NY (US); Vishnu Vardhan Reddy Beema, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 113 days.

(21) Appl. No.: 14/330,064

(22) Filed: Jul. 14, 2014

(65) Prior Publication Data
US 2016/0014772 A1    Jan. 14, 2016

(51) Int. Cl.
*H04W 72/04*    (2009.01)
*H04J 3/02*    (2006.01)
(Continued)

(52) U.S. Cl.
CPC ...... *H04W 72/0446* (2013.01); *G08B 25/007* (2013.01); *H04J 3/02* (2013.01);
(Continued)

(58) Field of Classification Search
CPC ..... H04L 61/6059; H04L 67/12; H04L 63/08; H04L 12/2803; H04L 61/6072;
(Continued)

(56) References Cited

U.S. PATENT DOCUMENTS 8,107,427 B1 *   1/2012   Husted ............... H04W 4/18
                                              370/329
8,325,627 B2 *  12/2012   Pratt, Jr. ............. H04L 12/66
                                              370/255
(Continued)

FOREIGN PATENT DOCUMENTS

KR    10-2009-0092495    9/2009

OTHER PUBLICATIONS

English-languge abstract for KR patent application publication 10-2009-0092495, published Sep. 1, 2009.
(Continued)

*Primary Examiner* — Sai Aung
(74) *Attorney, Agent, or Firm* — Husch Blackwell LLP

(57) ABSTRACT

A system is provided that includes a control panel having a wireless transceiver that operates under a 6LowPan/IPv6/IoT protocol, wherein the 6LowPan/IPv6/IoT protocol supports one or more of a 6LowPan protocol, an IEEE802.15.4 protocol, and IEEE802.11 coordination, a plurality of remotely located, wireless devices each having a wireless transceiver that exchanges messages with the control panel within a time division multiple access (TDMA) slot on a radio frequency (RF) channel, and a respective processor within the control panel and each of the plurality of wireless devices that controls transmission and reception of messages within TDMA slots of a repeating super frame, wherein at least some of the plurality of wireless devices select TDMA slots of the super frame under a carrier sense multiple access with collision avoidance (CSMA/CA) algorithm/mechanism and some other of the plurality of wireless devices select TDMA slots of the super frame under a WiFi protocol.

9 Claims, 3 Drawing Sheets

(51) Int. Cl.
*G08B 25/00* (2006.01)
*H04W 74/08* (2009.01)
*H04W 84/18* (2009.01)
*H04W 84/12* (2009.01)
*G08B 13/00* (2006.01)

(52) U.S. Cl.
CPC ......... *G08B 13/00* (2013.01); *H04W 74/0816* (2013.01); *H04W 84/12* (2013.01); *H04W 84/18* (2013.01)

(58) Field of Classification Search
CPC ... H04L 63/0442; H04L 9/0861; H04L 69/08; H04L 63/045
USPC ................................ 370/337, 338, 328, 254
See application file for complete search history.

(56) References Cited

U.S. PATENT DOCUMENTS

| | | | |
|---|---|---|---|
| 2008/0316966 A1* | 12/2008 | Joshi | H04W 74/02 370/330 |
| 2011/0176465 A1* | 7/2011 | Panta | H04W 52/0235 370/311 |
| 2012/0106394 A1* | 5/2012 | Apostolakis | H04L 69/18 370/254 |
| 2013/0155957 A1* | 6/2013 | Shin | H04W 4/00 370/328 |
| 2014/0126655 A1* | 5/2014 | Vijayasankar | H04B 3/54 375/257 |
| 2014/0233536 A1 | 8/2014 | Kang et al. | |
| 2014/0376427 A1* | 12/2014 | Hui | H04L 5/16 370/296 |

OTHER PUBLICATIONS

Extended European search report for corresponding EP patent application 15175774.7, dated Nov. 27, 2015.
Haleh Khojasteh et al., A two-tier integrated RFID/ sensor network wi th a WiFi WLAN, Wireless Communications and Mobile Computing Conference (IWCMC).
2012 8th International, IEEE, Aug. 27, 2012, pp. 521-525.

* cited by examiner

6LOWPAN BASED MULTIDISCIPLINARY WIRELESS SENSOR PROTOCOL FOR CONNECTED HOME SECURITY SYSTEMS

FIELD

The field of this invention relates to sensor systems and, more particularly, to networked sensor systems.

BACKGROUND

Systems are known to detect threats within secured areas. Threats may be based upon the occurrence of any of a number of different events that represent a risk to human safety or security or a risk to assets. For example, a fire may represent a threat to human occupants of a secured area not only because of the possibility of burns, but also because of the possibility of death due to smoke inhalation.

The presence of unauthorized intruders within a secured area may also represent a threat in the case where an intruder may be a burglar intent on the theft of assets. However, a burglar could also be a threat to the safety of human occupants who interfere with the theft.

Security systems are typically based upon the use of one or more sensors that detect a specific threat within the area. The sensors may be fixed devices and/or mobile devices, such as a FOB. For example, fire, smoke, and/or intrusion detectors may be distributed throughout the secured area in order to mitigate damage through the early detection of fire or intrusion. The sensors can be supervised or unsupervised.

In most cases, the sensors may be monitored by a control panel. In the event that one of the sensors is activated, the control panel may activate a local audible alarm to warn occupants in the area of the threat. The control panel may also send an alarm message to a central monitoring station. A portable device, such as key fob, may be used to send emergency alerts (e.g., panic alarms, medical alerts, police alerts, etc.) to the control panel and also to send commands (e.g., arm, disarm, etc.) to the control panel. The control panel may also include a keypad and an audible siren.

In the case of industrial or public spaces, security systems may cover large areas and incorporate hundreds or even thousands of sensors. In order to accommodate such large numbers of devices, the control panel and sensors may be connected via a wireless interface.

However, security systems are often difficult to set up and use with such large numbers of sensors. Accordingly, a need exists for better methods of maintaining contact between a control panel and each of the sensors in a wireless security system.

DETAILED DESCRIPTION

Figure 1:
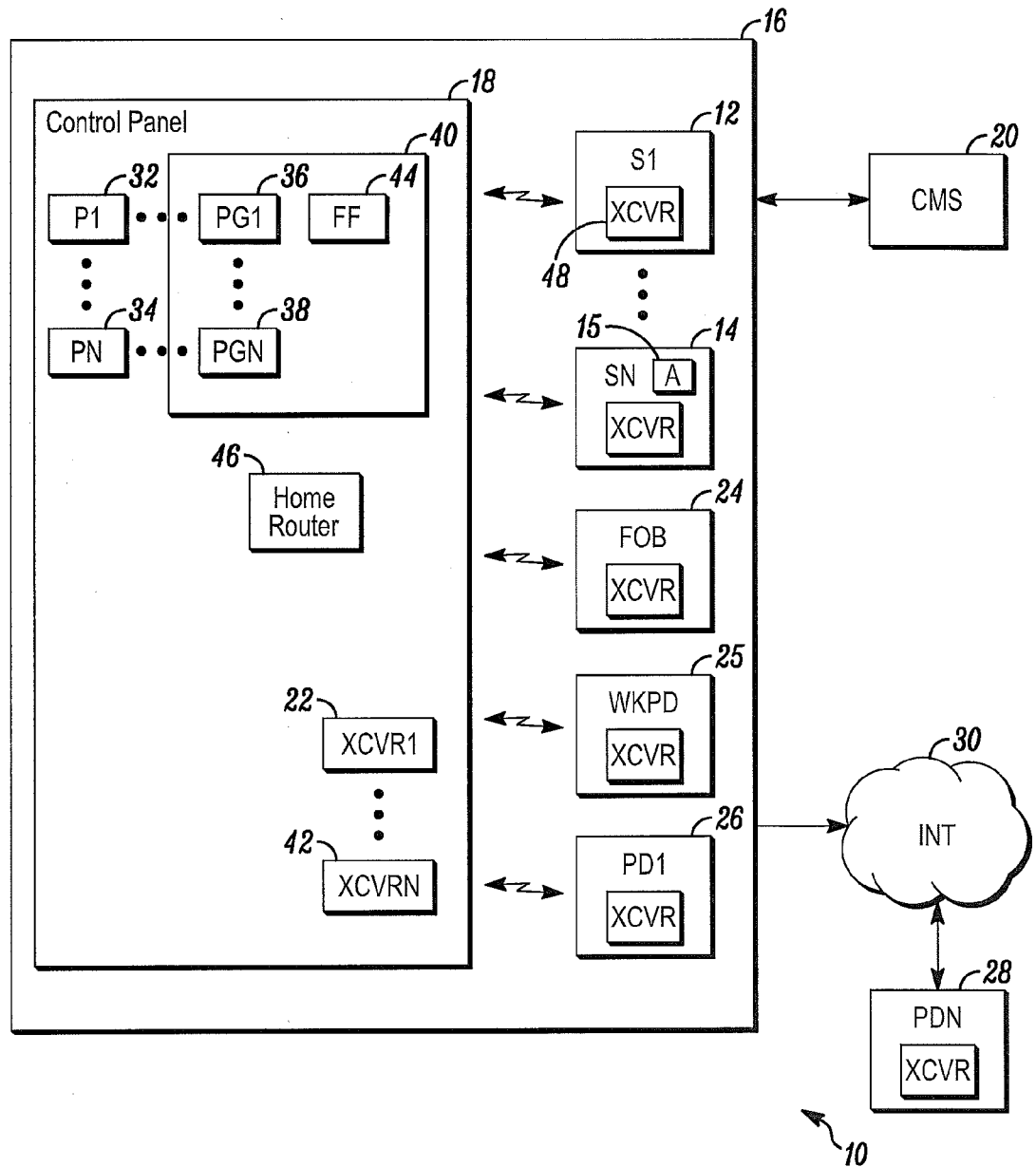
FIG. 1 illustrates a block diagram of a security system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 is a block diagram of a security system 10 shown generally in accordance with an illustrated embodiment. Included within the security system may be one or more wireless sensors 12, 14 that monitor a secured area 16 for threats.

The sensors may be based upon any of a number of different sensing technologies. For example, one or more of the sensors may be fire, smoke, or gas detectors. Some other of the sensors may be intrusion detectors. The sensors may also be provided with respective audible or visual alerting devices 15 that alert human occupants to danger. The security system may also include other wireless devices, such as key fobs or keypads.

The sensors may be monitored for activation by a control panel 18 containing a radio or gateway. The control panel may be located within the secured area as shown in FIG. 1 or may be located remotely from the secured area.

Upon activation of one of the sensors, the control panel may send an alarm message to a central monitoring station 20. The alarm message may include an identifier of the security system (e.g., account number, address, etc.), an identifier of the type of sensor, a system or zone identifier of the sensor, and a time of activation of the sensor.

The central monitoring station may respond by summoning the appropriate help. For example, if the sensor is determined to be a fire sensor, then the central monitoring station may summon a local fire department. On the other hand, if the sensor is identified to be an intrusion sensor, then the central monitoring station may summon the police.

All of the sensors may be coupled to the control panel via a wireless interface. In this regard, a radio frequency (RF) transceiver 22, 48 within the control panel and each of the sensors may together form a portion of the wireless interface that allows each of the sensors to exchange messages with the control panel.

The security system may also include one or more wireless fobs 24 and/or wireless key pads 25 that are used to control a state of the security system (e.g., armed, disarmed, armed away, etc.). Each of the fobs may include a user interface (e.g., pushbuttons, LED indicators, etc.) and a wireless RF transceiver that allows each fob to exchange control messages with the control panel. Key pads may also include a user interface (e.g., keyboard and display) and a wireless RF transceiver that allows each key pad to exchange control messages with the control panel.

Also included within the secured area may be one or more portable wireless devices (e.g., iPhones, Android devices, etc.) 26. The portable devices 26 may exchange data with one or more other devices 28 through the Internet 30 under an appropriate format (e.g., TCP/IP, etc.).

The portable wireless devices 26 may exchange signals through the Internet via one or more WiFi transceivers 42 located within the secured area. The WiFi transceivers may be coupled to a local Internet service provider via a home router 46 and a hardwired connection between the control panel and the local Internet service provider.

Included within the control panel, the sensors, the fob, and the portable wireless devices is control circuitry that may include one or more processor apparatus (processors) 32, 34 each operating under control of one or more computer programs loaded from a non-transitory computer readable medium (memory) 40. As used herein, reference to a step performed by a computer program is also reference to the processor that executed that step.

Included within the control panel may be one or more communication processors that define 44 a super frame for communication between the control panel, sensors, fobs, and portable wireless devices.

The super frame may be defined within a frame file 44 by a number of time division multiple access (TDMA) slots that re-occur over a predetermined time period. At least some of the slots may be reserved for use by the sensors and/or fobs under a 6LowPan/IPv6/IoT protocol. At least some other of the slots may be reserved for use by the portable wireless devices under an IEEE802.11 or WiFi protocol. FIG. 1 shows two transceivers 22, 42 (one for the 6LowPan/IPv6/IoT protocol and one for the IEEE802.11 protocol).

Figure 2:
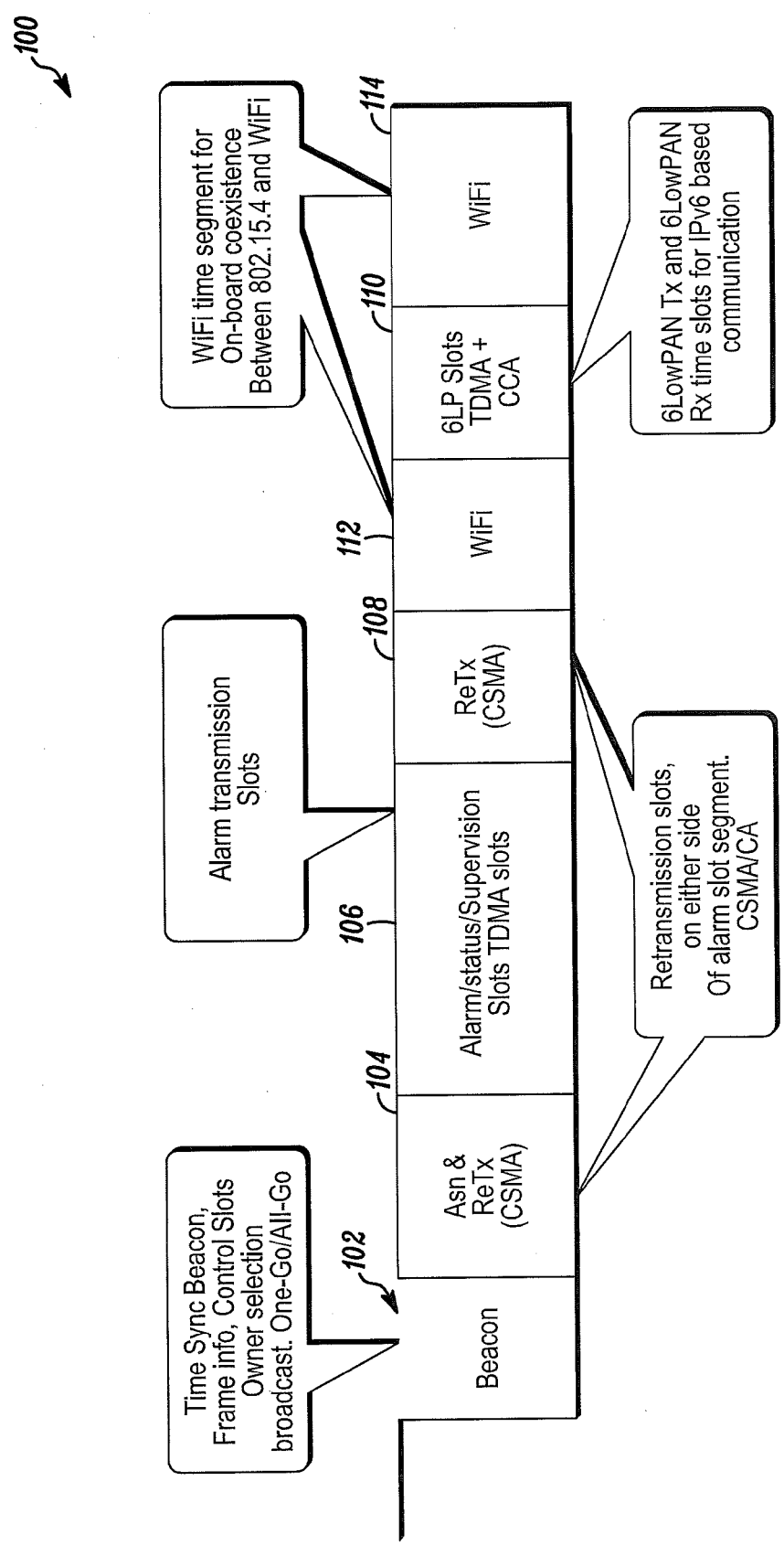
FIG. 2 depicts a super frame that may be used by the system of FIG. 1.

FIG. 2 depicts an example of the super frame 100 used within the system of FIG. 1. The superframe is multidisciplinary because it supports standards such as IEEE802.15.4 and 6LowPan and also facilitates coexistence with other systems, such as IEEE802.11 and ZigBee based systems. In this regard, a home router 46 operates to route messages between processors of the control panel and each of the sensors, FOBs, and PDs.

As shown, the super frame includes a slot 102 for a beacon and a first set of slots 104, 106, 108, 110 reserved for the exchange of messages between the sensors and the control panel and between the fob and control panel under the IEEE 802.15.4 and 6LowPAN protocols. A second set of slots 112, 114 is reserved for the exchange of messages between the portable wireless devices and the Internet under a WiFi protocol.

The frame file may be embodied as a number of time thresholds distributed across the sensors and coordinators that identify the locations of various markers within the super frame. For example, the slot 102 may be identified by a starting time (i.e., zero seconds) and an ending time (e.g., 5 milliseconds). Similarly, the starting and ending times of each of the first and second sets of slots may be defined by their offset from the start of the super frame. In addition, the frame file may also include an identifier of the type of device allowed to use each slot as well as an indicator of the type of message that may be transmitted in any slot.

The beacon identifies a starting point of the super frame and incorporates a number of data fields defined and populated by a beacon processor. The data fields may include a first field for frame information and one or more control slots.

Figure 3:
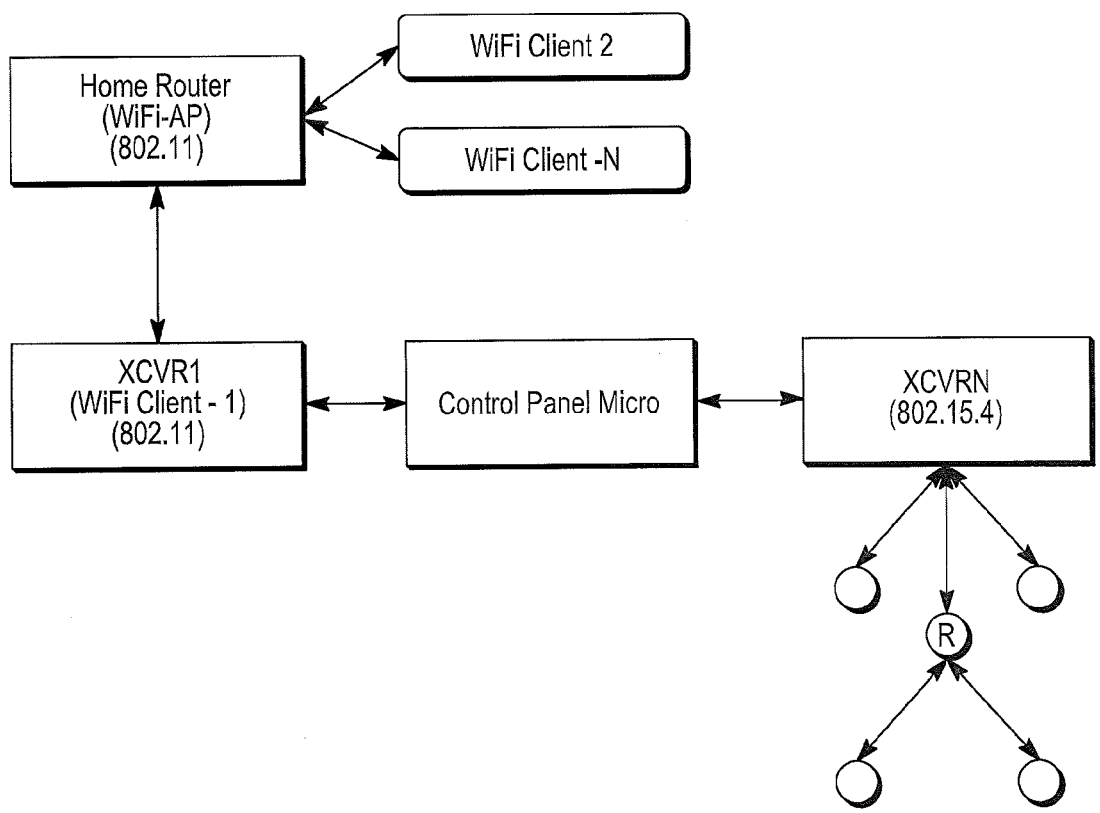
FIG. 3 depicts a wireless connection diagram between sensors and the control panel of FIG. 1.

Each device (e.g., sensors, fobs, etc.) in the system has a short address, an IPv6 (6LowPan) address, and a MAC identifier (MAC ID). The addressing system facilitates accessing of the sensors and fobs by any IPv6 compatible device under Internet of Things (IoT) concepts. This allows the sensors to be arranged by respective processors into star or tree networks as shown in FIG. 3, but not into a mesh network.

The status of the control panel (e.g., armed, disarmed, trouble, etc.) is carried as part of the beacon payload. Also, if required, a detailed indicator of panel status may be carried within respective slots under the 6LowPAN/802.15.4 protocols.

The control slots of the beacon may be used by a message processor of the control panel to send request messages from the control panel to end devices (e.g., sensors, fobs, etc.) using a unicast, multicast, or broadcast format based upon the IEEE802.15.4 addresses of the end devices. One type of message transmitted within the control slots is a One-Go/All-Go message that is received and processed by each sensor where the audible and/or visual alerting device of each sensor is activated simultaneously in response to an alarm event or message received from one of the sensors.

Any of a number of different types of devices may be incorporated into the system as sensors or fobs. The devices may be enrolled into the system via a manual enrollment or by a downloader based enrollment mode supported by an enrollment processor. The frame file may be downloaded to the sensors and fobs during commissioning or at the start of each super frame within one of the control slots.

Within the first set of slots of the super frame, a first portion 106 is reserved for alarm, status, and supervision messages between the control panel and sensors. As alarm, status, and supervision messages have limited data size, an IEEE802.15.4 packet format is used by a corresponding packet processor to optimize the airtime of these messages. This protocol supports the star or tree topology needed to accommodate scenarios that demand a larger range.

In general, network information from the control panel is based upon dynamic PAN-ID and a 802.15.4 channel number for single channel operation. Sensors and/or fobs conforming with this information may enroll with the control panel automatically immediately after activation. End device commissioning of each sensor may be based upon a common secret message encryption key and an end device unique MAC-ID.

Sensors may arrange themselves into the star or tree topology including a coordinator, a repeater, and one or more end devices based upon this information. Packet exchanges between parent and child devices may occur using one or more of slots 104, 106, 108, 110, and not slot 112 and not slot 114. DNA profile transmissions (i.e., the sensor identifies what it is) and configuration transactions between the coordinator and end devices may be used to facilitate the arranging of these devices into the star or tree topology.

The coordinator operates to forward the beacon to end devices. In this case, the coordinator operates as a low power repeater system with dynamic end device wake-up and synchronization.

Alarm, status, and supervisory messages to the control panel may result in bi-directional communication between the coordinator and end devices. Secured encrypted communication over the air for each message may be accomplished using network keys.

Alarm messages from a sensor to the control panel may be accomplished via one of the slots of the second portion 106. In this case, an activated sensor may wake-up upon the occurrence of an event (e.g., fire, intrusion, etc.). An alarm processor within the sensor may detect the event, compose an alarm message, synchronize with its superframe beacon, identify a slot based upon the frame file, and transmit the alarm message at a corresponding location within the super frame. Each slot of the TDMA super frame may include sufficient time for transmission of an encrypted packet plus enough time for a MAC level ACK message from the parent.

If a sensor does not receive an ACK message within a slot of the first portion 106, then the alarm processor of the sensor may resend the alarm message under a carrier sense multiple access and collision avoidance CSMA/CA algorithm/mechanism. In this case, the activated sensor may select a slot within one of the slots 104, 108 by first attempting to sense other users. If no other user is detected, then the sensor may retransmit the alarm message to the control panel within the selected slot.

WiFi devices may operate in one or both of slots 112, 114. A strobe to devices operating under this protocol may be sent based upon slot availability at the end of the super frame. Alternatively, WiFi devices may synchronize via hardwired signals.

In general, the system includes a control panel having a wireless transceiver that operates under a 6LowPan/IPv6/IoT or equivalent protocol, wherein the 6LowPan/IPv6/IoT protocol supports one or more of a 6LowPan protocol, an IEEE802.15.4 protocol, and IEEE802.11 coordination, a plurality of remotely located, wireless devices each having a wireless transceiver that exchanges messages with the control panel within a time division multiple access (TDMA) slot on a radio frequency (RF) channel and a respective processor within the control panel and each of the plurality of wireless devices that controls transmission and reception of messages within TDMA slots of a repeating super frame, wherein at least some of the plurality of wireless devices select TDMA slots of the super frame under a carrier sense multiple access with collision avoidance (CSMA/CA) algorithm or mechanism (CSMA/CA algorithm/mechanism) and some other of the plurality of wireless devices select TDMA slots of the super frame under a WiFi protocol. In this regard, there can be 802.11 time segments and 802.15.4 time segments. In the 802.15.4 segments, there can be one or more slots, some of which use CSMA/CA based mechanisms (depicted as CSMA/CA slots) and others that do not use the CSMA/CA based mechanisms (depicted as TDMA slots).

Alternatively, the system includes a control panel, a wireless transceiver of the control panel and a processor of the control panel that exchanges a plurality of messages through the wireless transceiver within a repeating super frame, wherein the repeating super frame further comprises a first portion that operates under 6LowPan/IPv6/IoT and IEEE802.15.4 protocols and a second portion that operates under IEEE802.11 coordination.

As a still further alternative, the system includes a control panel, a wireless transceiver of the control panel, a processor of the control panel that exchanges a plurality of messages through the wireless transceiver within a repeating super frame, wherein the repeating super frame further comprises a first portion that operates under 6LowPan/IPv6/IoT and IEEE802.15.4 protocols and a second portion that operates under IEEE802.11 coordination, a plurality of remotely located, wireless devices each having a wireless transceiver that exchanges messages with the control panel within a time division multiple access (TDMA) slot of the repeating super frame on a radio frequency (RF) channel, and a respective processor within the control panel and each of the plurality of wireless devices that controls transmission and reception of messages within TDMA slots of the repeating super frame, wherein at least some of the plurality of wireless devices select TDMA slots of the super frame under a carrier sense multiple access with collision avoidance (CSMA/CA) algorithm/mechanism and some other of the plurality of wireless devices select TDMA slots of the super frame under a WiFi protocol.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A system comprising:
a control panel having a first wireless transceiver that operates under a IPv6 over Low Power Wireless Personal Area Network (WPAN)(6LowPan)/Internet Protocol version 6(IPv6)/Internet of Things(IoT) protocol, wherein the 6LowPan/IPv6/IoT protocol supports one or more of a 6LowPan protocol, an Institute of Electrical and Electronics Engineers(IEEE)802.15.4 protocol, and IEEE802.11 coordination;
a plurality of remotely located, wireless devices, wherein each of the plurality of remotely located, wireless devices has a respective second wireless transceiver that exchanges first messages with the control panel within a respective one of a plurality of time division multiple access (TDMA) slots on a radio frequency (RF) channel; and
a first processor within the control panel and a respective second processor within each of the plurality of remotely located, wireless devices that control transmission and reception of the first messages within the plurality of TDMA slots of a repeating super frame,
wherein at least some of the plurality of remotely located, wireless devices select the respective one of the plurality of TDMA slots of the repeating super frame under a carrier sense multiple access with collision avoidance (CSMA/CA) algorithm/mechanism and some other of the plurality of remotely located, wireless devices select the respective one of the plurality of TDMA slots of the repeating super frame under a WiFi protocol,
wherein a first set of the plurality of TDMA slots is reserved for remotely located, wireless devices of the plurality of remotely located, wireless devices operating under the 6LowPan/IPv6/IoT protocol,
wherein a second set of the plurality of TDMA slots is reserved for remotely located, wireless devices of the plurality of remotely located, wireless devices operating under the WiFi protocol, and
wherein the first wireless transceiver of the control panel transmits a beacon that identifies a temporal location of the first set of the plurality of TDMA slots to the at least some of the plurality of remotely located, wireless devices.

2. The system as in claim 1 wherein a third set of the plurality of TDMA slots is reserved for remotely located, wireless devices of the plurality of remotely located, wireless devices operating under the 6LowPan/IPv6/IoT protocol operating under the CSMA/CA algorithm/mechanism.

3. The system as in claim 1 wherein the at least some of the plurality of remotely located, wireless devices operate under the 6LowPan/IPv6/IoT protocol.

4. The system as in claim 3 wherein the beacon further comprises unicast, multicast, or broadcast messages simultaneously activating a respective audio indicator of each of the at least some of the plurality of remotely located, wireless devices.

5. The system as in claim 1 wherein the at least some of the plurality of remotely located, wireless devices comprise sensors.

6. The system as in claim 5 wherein the sensors comprise intrusion sensors.

7. The system as in claim 5 wherein the sensors comprise life safety sensors.

8. The system as in claim 5 wherein the control panel, the sensors, and audio alarm devices comprise a security system.

9. A system comprising:
   a control panel;
   a first wireless transceiver of the control panel;
   a first processor of the control panel that exchanges messages with a plurality of remotely located, wireless devices through the first wireless transceiver within a repeating super frame, wherein the repeating super frame comprises a first portion that operates under IPv6 over Low Power Wireless Personal Area Network (WPAN)(6LowPan)/Internet Protocol version 6(IPv6)/Internet of Things(IoT) and Institute of Electrical and Electronics Engineers(IEEE)802.15.4 protocols and a second portion that operates under IEEE802.11 coordination;
   a respective second wireless transceiver of each of the plurality of remotely located, wireless devices that exchanges the messages with the control panel within a respective one of a plurality of time division multiple access (TDMA) slots of the repeating super frame on a radio frequency (RF) channel; and
   a respective second processor within each of the plurality of remotely located, wireless devices that controls transmission and reception of the messages within the plurality of TDMA slots of the repeating super frame,
   wherein at least some of the plurality of remotely located, wireless devices select the respective one of the plurality of TDMA slots of the repeating super frame under a carrier sense multiple access with collision avoidance (CSMA/CA) algorithm/mechanism and some other of the plurality of wireless devices select the respective one of the plurality of TDMA slots of the repeating super frame under a WiFi protocol,
   wherein a first set of the plurality of TDMA slots is reserved for remotely located, wireless devices of the plurality of remotely located, wireless devices operating under the 6LowPan/IPv6/IoT protocol,
   wherein a second set of the plurality of TDMA slots is reserved for remotely located, wireless devices of the plurality of remotely located, wireless devices operating under the WiFi protocol, and
   wherein the first wireless transceiver of the control panel transmits a beacon that identifies a temporal location of the first set of the plurality of TDMA slots to the at least some of the plurality of remotely located, wireless devices.

* * * * *